United States Patent Office 3,134,744
Patented May 26, 1964

3,134,744
METHOD OF MAKING A COPOLYMER OF A VINYL MONOMER AND A POLYESTER CONTAINING TRIVALENT PHOSPHORUS INCORPORATED THEREIN BY ESTER LINKAGE
Werner Starck, Hofheim, Taunus, Fritz Rochlitz, Frankfurt am Main, and Jakob Winter and Herbert Vilcsek, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Mar. 4, 1958, Ser. No. 718,943
Claims priority, application Germany Mar. 8, 1957
2 Claims. (Cl. 260—45.4)

The present invention relates to novel phosphorated polyesters containing trivalent phosphorus in the molecule, and to a process for the manufacture of said polyesters and to their use.

The present invention furthermore provides a process for copolymerizing suitable phosphorus-containing polyesters with low molecular compounds containing activated carbon-carbon double bonds.

It is known to prepare polyesters from alcohols and carboxylic acids. Furthermore there are known polyesters in which the carboxylic acids are wholly or partially replaced by phosphoric acids (U.S. application Serial No. 709,171, filed on January 16, 1958, now abandoned), or phosphonic acids (U.S. application Serial No. 698,053, filed on November 22, 1957, now abandoned). The condensation resins so prepared are non-combustible or difficultly inflammable.

Now we have found that stable, non-combustible or difficultly inflammable phosphorus-containing condensation resins can also be obtained by reacting alcohols with carboxylic acids and derivatives of phosphorous acid.

An appropriate selection of the components and the proportions in which these components are to be used leads to viscous, water-insoluble, transparent and extremely stable products which are not attacked by water, even at higher temperatures.

This fact is remarkable since especially at higher temperatures water rapidly decomposes the phosphites of low molecular weight. It is furthermore remarkable that when phosphorus trihalides are used halogen can be incorporated into the resin by condensation, in addition to phosphorus, which fact is important for the manufacture of products which are difficultly inflammable.

The phosphorus compounds required for the manufacture of the novel resins are easily accessible. The resins prepared by the process of this invention can be obtained in two different ways. The phosphorus is either incorporated by reesterification of phosphorous acid esters or by esterification of the halides of trivalent phosphorus.

The process according to the invention can be carried out in a manner such that first the carboxylic acids are reacted with an excess of dihydric alcohols or with an excess of a mixture of mono- and polyhydric alcohols and that a reaction with a derivative of phosphorous acid is then brought about in a second stage.

The phosphorous acid esters, the ester radical of which contains up to 6 carbon atoms in a straight or branched chain and preferably consists of methyl, ethyl, n-propyl or isopropyl groups, can be also reesterified, together with the carboxylic acid esters, with the alcohols. It is likewise possible to react the halides of trivalent phosphorus with alcohols in the presence of carboxylic acids or esters of carboxylic acids. When carboxylic acid esters are used the hydrogen halide formed acts additionally as reesterification catalyst for the carboxylic acid esters.

It is furthermore possible first to react the halide of trivalent phosphorus or the phosphorous acid ester with a more or less large excess of a polyhydric alcohol or a mixture of mono- and polyhydric alcohols and then to react the reaction product in a second stage with a polybasic carboxylic acid or a mixture of monobasic and polybasic carboxylic acids.

When using mixtures of mono- and polyhydric alcohols the amount of one or several monohydric alcohols shall not exceed, in general, 50 mol percent calculated on the total amount of alcohols. In special cases, however, higher amounts of monohydric alcohols may be used.

In most of these reactions there can be used instead of the carboxylic acids the anhydrides thereof as far as they exist, or other reactive derivatives such as the esters and halides thereof.

The reesterification of the alkyl-phosphites or of mixtures of alkyl-phosphites with carboxylic acid esters is carried out according to processes generally known for carboxylic acid esters, for example with the addition of neutral, acid or basic catalysts, either under reduced pressure, atmospheric pressure or under elevated pressure at temperatures above 90° C. ranging up to about 200° C., preferably from 150 to 180° C. It is advisable continuously to distill off from the reaction mixture the monohydric alcohol set free such as methanol, propanol, butanol etc. As reesterification catalysts there may be used neutral, acid or basic compounds such as para-toluene sulfochloride, para-toluene sulfonic acid or the esters thereof, hydrogen chloride, sulfuric acid, phosphoric acid, calcium oxide, lead oxide, zinc oxide, sodium or potassium methylate, sodium or potassium ethylate, lithium hydride or sodium acetate.

When incorporating the phosphorus with the aid of the halides of trivalent phosphorus it is advisable to operate in a manner such that the phosphorus halide is added slowly to a polyhydric alcohol or a mixture of mono- and polyhydric alcohols or a carboxylic acid polyester having free hydroxyl groups. The reaction temperature may vary between 0 and 100° C., preferably between 10 and 40° C.

The temperature shall not exceed, in general, 100° C. since otherwise coloration may occur. According to the viscosity of the alcohol or the polyester containing OH groups it may be necessary simultaneously to use a solvent. There may be particularly used hydrocarbons such as benzene, toluene, xylene or cyclic ethers such as tetrahydrofurane or dioxane. The hydrogen halide set free in the course of the reaction can be removed under reduced pressure, by passing through an inert gas current for example $N_2$, $CO_2$ or, if desired, by suitable hydrogen halide acceptors such as tertiary amines, for example triethyl amine or dimethyl aniline, or also by heating. The removal of the hydrogen halides is furthermore favored by cyclic ethers such as tetrahydrofurane or dioxane mentioned above as solvents.

According to the selection of the reaction conditions there are obtained more or less cross-linked products. Fairly cross-linked products are obtained when phosphorous acid esters or halides of trivalent phosphorus are reacted with polyhydric alcohols. Resins of this kind are more or less difficultly soluble according to their degree of cross-linking. By the incorporation of monohydric alcohols the cross-linking is reduced or avoided depending on the amount of monohydric alcohol used, the solubility of the resins increasing accordingly. It is sufficient, in general, to add 1 mol of a monohydric alcohol per 1 mol of a phosphorous acid derivative in order to obtain products which are soluble in hydrocarbons. Similar results can be obtained when, for example, the phosphorous acid esters of monohydric alcohols are reacted in the presence of carboxylic acids with an amount of dihydric alcohols such that per ester group of the phosphorous acid ester and per carboxylic group one hydroxyl group is available, until a conversion rate of about 66% is attained, whereupon the unreacted dihydric alcohol is removed under reduced pressure. In the latter reaction it is likewise possible to operate straight away with a deficiency of dihydric alcohol in order to reesterify only two ester groups.

As phosphorus compounds there may be used, on the one hand, the halides of trivalent phosphorus, such as phosphorus trichloride or phosphorus tribromide, the first compound being more important, and on the other hand the secondary and tertiary esters of phosphorous acid. As phosphorous acid esters there come into consideration, in principle, all aliphatic, saturated or unsaturated esters, the esters of phosphorous acid and a low boiling, easily volatile mono-alcohol, such as methanol, ethanol, n- and iso-propanol and the various butanols being the most important. There are especially mentioned the easily accessible diethyl- and triethyl phosphite. Of course there may be also used mixtures of secondary and tertiary phosphites.

The number of suitable polyhydric alcohols is, of course, extraordinarily large. There are mentioned for example: ethylene glycol, polyethylene glycols, propylene glycol, butylene glycol, hexane diol, butane diol, mono- and polycyclic alcohols such as tricyclodecane dimethylol or tricyclodecane trimethylol, glycerol, hexane triol, pentaerythrite, dipentaerythrite, sorbitol, diphenyl ethylene glycol, phthalyl alcohol, dimethyl-dihydroxymethylbenzene, partial alkyl ethers or partial esters of the aforementioned tri- or polyhydric alcohols which contain at least two free hydroxyl groups.

Especially suitable are polyhydric alcohols in which at most three carbon atoms appear between the hydroxyl groups. It is often advantageous to replace the polyhydric alcohols partially by saturated or unsaturated monohydric alcohols or to combine at least trihydric alcohols with monohydric alcohols, and these alcohols include all alcohols carrying in addition to the hydroxyl group other substituents, especially halogen. As monohydric alcohols there may be used methyl, ethyl, propyl and butyl alcohol, propargyl alcohol, benzyl alcohol, ethylhexanol, allyl alcohol, methallyl alcohol, cinnamic alcohol, oleyl alcohol, chlorethanol, tricyclodecanemethylol, dimethyl-hydroxymethyl benzene, epihydrinic alcohol, dichlorohydrine.

The amounts of the monohydric alcohols used preponderantly depend on the nature and amount of the polyhydric alcohol used. The amount of monohydric alcohols used shall not exceed, in general, 50 mol percent calculated on the total amount of alcohols.

As carboxylic acids there may be particularly used polybasic acids containing at least one carbon atom between the carboxyl groups such as malonic acid, succinic acid, chlorosuccinic acid, adipic acid, suberic acid, sebacic acid, isophthalic acid, phthalic acid, terephthalic acid, hexachlorendomethylene-tetrahydro-phthalic acid, maleic acid, fumaric acid, itaconic acid, mesaconic acid, citraconic acid, aconitic acid, malic acid, tartaric acid, trimesinic acid, tricarballylic acid, citric acid, hemimellithic acid, pyromellithic acid etc.

In addition to the afore-mentioned di- or polycarboxylic acids there may also be incorporated by condensation monobasic carboxylic acids and this has already been stated above. There come into consideration saturated or unsaturated aliphatic or cycloaliphatic, aromatic or heterocyclic carboxylic acids or hydroxy acids or carboxylic acids substituted by halogen, such as acetic acid, propionic acid, butyric acid, crotonic acid, sorbic acid, benzoic acid, chlorobenzoic acid, furane-carboxylic acid, cinnamic acid, acrylic acid, methacrylic acid, lactic acid, nicotinic acid, hydroxybutyric acid, the three chloroacetic acids, bromobenzoic acid, fatty acid of linseed oil, ricinoleic acid or ricinic acid.

The incorporation of the phosphorous acid derivatives can be varied within wide limits but shall not exceed 90 mol percent calculated on the number of the hydroxyl groups. In order to obtain products still having self-extinguishing properties the content of phosphorus must amount to at least 1.5% by weight calculated on the resin.

The phosphorus-containing condensation resins obtained by the process of this invention are high molecular compounds which, provided that they are not crosslinked, are well soluble in various organic solvents. The self-extinguishing properties or non-combustibility of these products are especially outstanding and these properties, which depend on the content of phosphorus, are already distinct if only a small amount of a phosphorous acid derivative is incorporated into acid product.

The products obtained by the process of this invention are suitable as flame-proofing agents, for impregnating paper and textiles, tissues of glass fibers etc., and they are also suitable as adhesives and lacquers, coating compounds and as intermediates and raw materials for the production of plastics. By a suitable selection of the esterification components, especially in case tri- or polyhydric alcohols are incorporated into the condensation products there may be produced varnishing resins which yield excellent fireproof films after having been baked.

In case there are incorporated into the phosphorus-containing condensation products obtained by this invention at least 5 mol percent of $\alpha,\beta$-unsaturated carboxylic acids and/or alcohols of the allyl type the condensation products can be polymerized, under known conditions, as such or in admixture with other, mostly low molecular compounds capable of being copolymerized and containing activated double bonds in which compounds said condensation products are soluble. By proceeding in this manner, hardened products are obtained which are insoluble in organic solvents in which they only swell. Said products are distinguished by a high transparency and, after having been inflamed by an igniting source, they extinguish automatically when said source is removed and this already with a content of phosphorus of 1.5% by weight calculated on the resin.

Copolymerization is brought about by exposure to light and/or by heating and/or by adding activators such as peroxides, for example benzoyl peroxide, tolyl peroxide, ditertiary-butyl peroxide, chlorobenzoyl peroxide, lauryl peroxide, oleic acid peroxide, methyl ethyl ketone hydroperoxide, tertiary butylhydroperoxide, cumene hydroperoxide or azodiisobutyronitrile. It is especially advantageous to use hydroperoxides. There may also be employed sulfinic acids, such as para-methoxy sulfinic acid, isoamyl sulfinic acid, dodecyl sulfinic acid, cyclohexyl sulfinic acid, benzene sulfinic acid, para-toluene sulfinic acid; sulfonamines such as N-bis-(para-tolylsulfonmethyl)-methylamine, N-para-tolylsulfon-methyl-2-hydroxyethylamine and sulfone carbinols such as para-tolylsulfone carbinol, phenylsulfone carbinol, para-tolylsulfone propylcarbinol or para-chlorophenyl carbinol.

As accelerators there may additionally be used organometal compounds, for example cobalt octoate etc.

As copolymerizable low molecular compounds suitable for use in this invention there may be mentioned by way of example: styrene, and styrenes alkylated in the nucleus and/or side chain, for example by a methyl or ethyl group, vinyl naphthalene, vinyl esters such as vinyl acetate, vinyl propionate, acrylic acid and methacrylic acid including the esters thereof with aliphatic monohydric alcohols containing 1–6 carbon atoms in a straight or branched chain, preferably, however, esters of alcohols containing 1–3 carbon atoms, and the nitriles thereof, allyl and methallyl esters of saturated or unsaturated mono- and polycarboxylic acids, for example acetic acid allyl ester, propionic acid methallyl ester, phthalic acid and terephthalic acid diallyl esters, succinic acid diallyl ester, maleic acid diallyl ester; allyl and methallyl carbonates, allyl and methallyl phosphates and phosphonates; esters of vinylphosphonic acid, for example the corresponding methyl or ethyl ester, triallyl cyanurate, triallyl trimesinate; low molecular unsaturated polyesters, for example those which have been prepared by the process described in U.S. application Serial No. 628,985, filed on December 18, 1956, and now abandoned, from terephthalic acid dialkyl esters, alkylene glycols and unsaturated dicarboxylic acids, if desired, in the presence of saturated acids or which have been prepared by the process described in U.S. application Serial No. 685,812, filed September 24, 1957, and now abandoned, from a mixture of monohydric alcohols with at least trihydric alcohols and α,β-unsaturated dicarboxylic acids, if desired, in the presence of saturated polycarboxylic acids. There may especially be used polyesters having allyl or methallyl ester groups and derivatives thereof, particularly those substituted by halogen, preferably chlorine, such as polyesters on the basis of tetrachlorophthalic acid and hexachlor-endo-methylene-tetrahydrophthalic acid.

By virtue of the capability of becoming insoluble under suitable conditions the polymerizable condensation products obtained by the process of this invention or mixtures of said products with other monomers are qualified for many applications, for example for producing shaped bodies, for impregnating paper and textiles and as lacquers and coating compounds for surface protection. Furthermore there may be incorporated into said products various materials, for example highly chlorinated hydrocarbons, filling materials of organic or inorganic nature and reinforcing materials, such as organic or inorganic fibers, for example glass fibers.

The phosphorus-containing condensation products obtained by the process of this invention which may be worked up into self-extinguishing shaped bodies are distinguished by the fact that they can easily be copolymerized with vinyl compounds, especially with styrene, and hardened. As compared therewith the likewise self-extinguishing polyester resins containing the phosphorus as low molecular allyl esters of its acids suffer from the known poorer polymerizability of allyl esters with unsaturated polyesters with respect to styrene and are, for example, less hard.

A further advantage of the masses produced according to the invention consists in the fact that almost all of them are nearly colorless since the derivatives of phosphorous acid clear up colors. Furthermore the manufacture of said masses is particularly economical.

The following examples serve to illustrate the invention but they are not intended to limit it thereto, the parts being by weight.

*Example 1*

160 parts of a polyester prepared by esterification of 444 parts of phthalic anhydride with 248 parts of ethylene glycol are dissolved in 400 parts of dioxane. Into said solution there are introduced 25 parts of butanol and 40 parts of phosphorus trichloride are then added dropwise at 40° C. After having terminated the addition the dioxane is distilled off. Then half the amount of fresh dioxane is added and again distilled off, finally under slightly reduced pressure. A colorless, highly viscous product is obtained having an acid number of 35 which dissolves, inter alia, in benzene and ethyl acetate.

*Example 2*

The same polyester solution as used in Example 1 is admixed with 40 parts of butanol and to the mixture there are added dropwise at 10° C. 40 parts of phosphorus trichloride. The dioxane is distilled off and fresh dioxane is added in order to eliminate the hydrogen chloride. Finally all solvent is distilled off, at last under reduced pressure. The product thus obtained in colorless, highly viscous and has a good solubility, for example in benzene, ethyl acetate, cresol etc.

*Example 3*

The same polyester as used in Example 1 is dissolved in dioxane and to the solution there are added 40 parts of butanol. The mixture is then reacted at 30–40° C. with 80 parts of phosphorus tribromide. After having distilled off the dioxane an almost colorless, highly viscous product is obtained which is well soluble.

*Example 4*

160 parts of a polyester prepared by reacting 294 parts of maleic anhydride with 248 parts of ethylene glycol are dissolved in 400 parts of dioxane. 30 grams of tricyclodecane methylol are added to the solution and 40 parts of phosphorus trichloride are allowed to drop in at 20–30° C. After having eliminated the dioxane there remains a phosphorus-containing polyester of very high viscosity which is well soluble.

*Example 5*

A polyester is prepared by reacting a mixture of 110 parts of glycerol, 102 parts of maleic anhydride, 83 parts of phthalic anhydride and 70 parts of amyl alcohol. 350 parts of the polyester thus obtained are dissolved in 200 parts of dioxane and mixed with 45 parts of amyl alcohol. Then there are added dropwise at 50° C. 35 parts of phosphorus trichloride. The dioxane is distilled off and replaced by fresh dioxane which is likewise distilled off.

The product obtained is highly viscous, transparent and almost colorless. It is soluble in ethyl acetate, benzene, ethyl glycol and other solvents and has an acid number of 40.

*Example 6*

124 parts of ethylene glycol are reacted at 140° C. with 104 parts of diethyl-phosphite in the presence of 1.5 parts of CaO. After having cooled to 90° C. 84 parts of tricyclodecane methylol and 123 parts of maleic anhydride are added and the mixture is esterified at 170° C. in the presence of xylene as water entrainer. A light, transparent, highly viscous resin is obtained having a good solubility.

*Example 7*

124 parts of ethylene glycol are reacted at 140° C. with 69 parts of diethyl-phosphite in the presence of 1 gram of CaO as catalyst. Then there are added to the reaction mixture 216 grams of maleic acid dimethyl ester and reesterification is brought about at 170° C., finally under reduced pressure. A highly viscous, transparent resin is obtained which does no longer flow and which is well soluble in aromatic hydrocarbons, esters and other solvents.

*Example 8*

212 parts of diethylene glycol are reacted at 120–140° C. with 97 parts of terephthalic acid dimethyl ester and 69 parts of diethyl-phosphite in the presence of 1 part of CaO. Then there are added to the reaction mixture 144 grams of maleic acid dimethyl ester and reesterification is brought about at 170° C., finally under reduced pressure. A highly viscous transparent and colorless resin is obtained which is no longer capable of flowing and which is well soluble in organic solvents.

*Example 9*

276 parts of glycerol are reacted at 170° C. with 124 parts of ethylene-glycol and 104 parts of diethyl-phosphite in the presence of 1.5 parts of CaO. The whole is then reacted with 212 parts of terephthalic acid dimethyl ester and 140 parts of fatty acid of linseed oil. The reaction mixture is finally esterified at 175° C. with maleic anhydride in the presence of xylene as water entrainer.

A highly viscous resin is obtained which is well soluble, inter alia, in dioxane, ethylene glycol monoethyl ether and esters of glycolic acid.

When dissolved in a suitable solvent the resin, after having been baked for 10 minutes at 170° C. furnishes a good film having an excellent flow.

Example 10

123 parts of maleic anhydride are esterified at 150° C. with 139 parts of ethylene glycol in the presence of xylene as water entrainer. Then 104 parts of diethyl-phosphite are added and the whole is reacted at 160° C. in the presence of 1.5 parts of CaO, finally under slightly reduced pressure.

A highly viscous, entirely colorless, transparent resin is obtained which is well soluble in higher alcohols, esters and other solvents.

Example 11

A resin is produced by reacting at 120–140° C. 124 parts of ethylene glycol with 83 parts of triethyl-phosphite in the presence of 1 part of CaO. The resin so obtained is then reesterified at 180–190° C. with 180 parts of maleic acid dimethyl ester. A very light-colored, transparent and viscous resin is obtained having good solubility properties.

Example 12

100 parts of a condensation product prepared from 294 parts of maleic anhydride, 248 parts of ethylene glycol, 75 parts of butanol and 120 parts of phosphorus trichloride are admixed with 2 parts of benzoyl peroxide and heated to 100° C. After some hours a hard product is obtained which is insoluble in organic solvents and which is difficulty inflammable and self-extinguishing.

Example 13

70 parts of the same phosphorus-containing condensation product as used in Example 12 are admixed with 30 parts of methyl styrene and stirred until the mixture is homogeneous. After the addition of 0.5% of benzoyl peroxide the liquid rapidly loses its flowability at 90° C. and solidifies to form a hard transparent mass which is insoluble in organic solvents.

Example 14

70 parts of the same condensation product as used in Example 12 are mixed with 30 parts of diallyl phthalate and 1% of benzoyl peroxide is added to the mixture. The liquid gelatinizes in the heat after a short time and solidifies to form an insoluble, transparent mass which, after ignition, is self-extinguishing.

Example 15

70 parts of a condensation product from 124 parts of ethylene glycol, 104 parts of diethyl-phosphite, 84 parts of tricyclodecane methylol and 123 parts of maleic anhydride are admixed with 30 parts of styrene and hardened at 80° C. after the addition of 0.5% of benzoyl peroxide. A hard transparent mass is obtained which is insoluble in organic solvents.

Example 16

30 parts of vinyl acetate are added to 70 parts of the same phosphorus-containing condensation product as used in Example 15 and to the mixture there is then added 1% of benzoyl peroxide. At 80° C. a hard insoluble product is obtained.

Example 17

70 parts of the same phosphorus-containing condensation product as used in Example 15 are mixed with 30 parts of diallyl-terephthalate. Then 1% of benzoyl peroxide is added whereupon the solution rapidly gelatinizes and hardens at 100° C. The casting so obtained is no longer soluble in organic solvents.

Example 18

30 parts of cyclohexyl-phosphonic acid diallyl ester are added to 70 parts of the same phosphorus-containing condensation product as used in Example 15. An insoluble casting is obtained after hardening with 1% of benzoyl peroxide at 100° C. After inflammation by external action it extinguishes at once when the source of ignition is removed.

Example 19

A viscous, transparent condensation product is prepared of 222 parts of phthalic anhydride, 186 parts of ethylene glycol, 87 parts of allyl alcohol and 205 parts of phosphorus trichloride. Said condensation product is admixed with 2% of benzoyl peroxide and after a polymerization at 100° C. there are obtained hard transparent masses.

We claim:

1. The method of making a combustion resistant copolymer containing at least 1.5 percent by weight of phosphorus which comprises copolymerizing (A) a vinyl monomer, and (B) an olefinically unsaturated polyester containing trivalent phosphorus incorporated into the molecule by ester linkages and obtained by heating, at a temperature between about 90° C. and about 200° C., a phosphorous acid alkyl ester having at least two alkyl groups of from one to four carbon atoms, a saturated polyhydric alcohol, and an ester of a monohydric alcohol and, an α,β-unsaturated polycarboxylic acid, said phosphorous acid alkyl ester being present in the reaction mixture in an amount up to 90 mol percent of the hydroxy groups of said polyhydric alcohol such that the polyester product formed contains at least 1.5 percent by weight of phosphorus.

2. The method as in claim 1 wherein said vinyl monomer is selected from the group consisting of methyl styrene, diallyl phthalate, styrene, vinyl acetate, diallyl terephthalate, and cyclohexyl phosphonic acid diallyl ester.

References Cited in the file of this patent

UNITED STATES PATENTS

| | | |
|---|---|---|
| 2,197,855 | Ellis | Apr. 23, 1940 |
| 2,437,046 | Rothrock et al. | Mar. 2, 1948 |
| 2,437,232 | Rothrock et al. | Mar. 2, 1948 |
| 2,465,319 | Whinfield et al. | Mar. 22, 1949 |
| 2,819,247 | Lundberg | Jan. 7, 1958 |
| 2,824,085 | Cummings | Feb. 18, 1958 |
| 2,829,120 | Parker | Apr. 1, 1958 |
| 2,931,746 | Robitschek et al. | Apr. 5, 1960 |